(12) United States Patent
Dai et al.

(10) Patent No.: US 8,160,070 B2
(45) Date of Patent: Apr. 17, 2012

(54) FIBRE CHANNEL PROXY

(75) Inventors: Chung Dai, San Jose, CA (US); Som Sikdar, San Jose, CA (US); Erik de la Iglesia, San Jose, CA (US)

(73) Assignee: Gridiron Systems, Inc., Sunnyvale, CA (US)

( * ) Notice: Subject to any disclaimer, the term of this patent is extended or adjusted under 35 U.S.C. 154(b) by 261 days.

(21) Appl. No.: 12/568,612

(22) Filed: Sep. 28, 2009

(65) Prior Publication Data

US 2010/0080237 A1    Apr. 1, 2010

Related U.S. Application Data

(60) Provisional application No. 61/101,645, filed on Sep. 30, 2008.

(51) Int. Cl.
  *H04L 12/28* (2006.01)
(52) U.S. Cl. .................. 370/392; 370/389; 370/400
(58) Field of Classification Search .................. None
  See application file for complete search history.

(56) References Cited

U.S. PATENT DOCUMENTS

| | | | |
|---|---|---|---|
| 6,678,795 B1 | 1/2004 | Moreno et al. | |
| 6,721,870 B1 | 4/2004 | Yochai et al. | |
| 6,789,171 B2 | 9/2004 | Desai et al. | |
| 7,017,084 B2 * | 3/2006 | Ng et al. | 714/45 |
| 7,089,370 B2 | 8/2006 | Luick | |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 | 7/2011 | Holscher et al. | |
| 2006/0053263 A1 | 3/2006 | Prahlad et al. | |
| 2007/0118710 A1 | 5/2007 | Yamakawa et al. | |
| 2008/0320269 A1 | 12/2008 | Houlihan et al. | |
| 2009/0276588 A1 | 11/2009 | Murase | |
| 2009/0307388 A1 * | 12/2009 | Tchapda | 710/33 |
| 2010/0080237 A1 * | 4/2010 | Dai et al. | 370/400 |

* cited by examiner

*Primary Examiner* — Robert Wilson
(74) *Attorney, Agent, or Firm* — Stolowitz Ford Cowger LLP

(57) ABSTRACT

A fibre channel proxy proxies storage operations in a fibre channel storage network. A first set of fibre channel proxy ports are configured to receive storage operations from one or more initiators. A second set of fibre channel proxy ports are configured to forward the storage operations to one or more storage targets. Fibre channel port identifiers for the storage targets are used to communicate with the initiators during the storage operations over the first set of fibre channel proxy ports. Fibre channel port identifiers for the initiators are used to communicate with the storage targets during the storage operations over the second set of fibre channel proxy ports. This scheme allows the fibre channel to operate transparently in the fibre channel network.

32 Claims, 12 Drawing Sheets

(BACKGROUND)

(BACKGROUND)

(BACKGROUND)

(BACKGROUND)

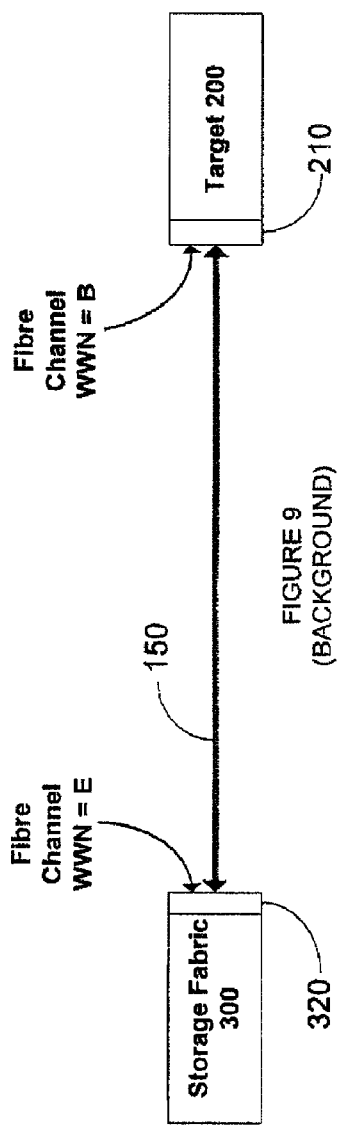
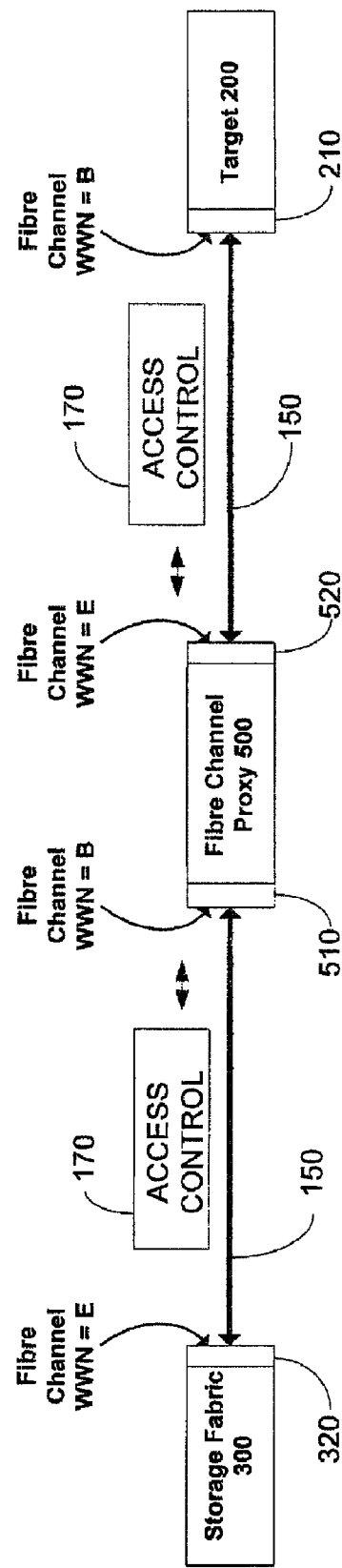

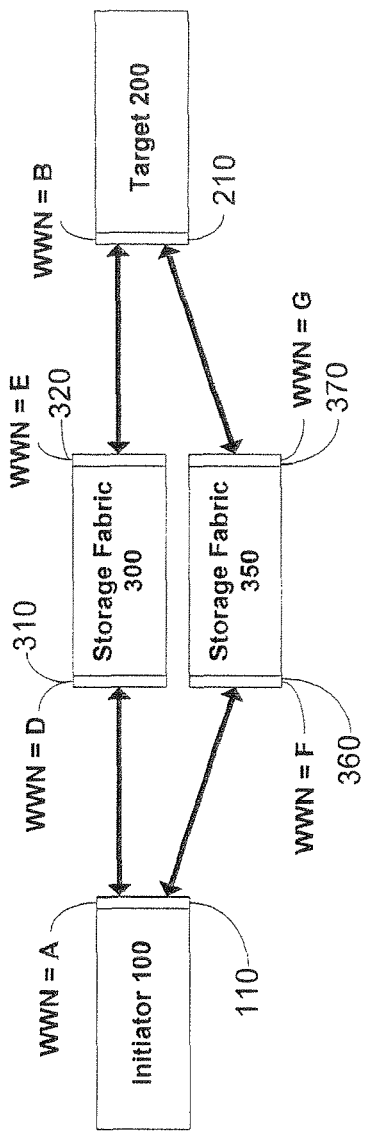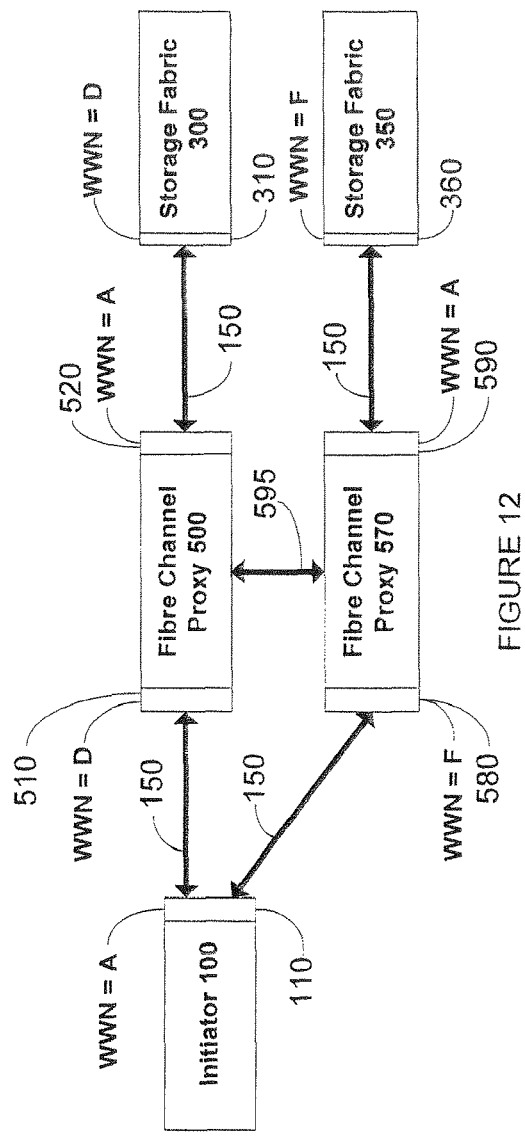

FIBRE CHANNEL PROXY

The present application claims priority from Provisional Application Ser. No. 61/101,645 filed Sep. 30, 2008, which is incorporated by reference in its entirety.

BACKGROUND

Fibre Channel (FC) provides practical, inexpensive, expandable means of transferring data between workstations, mainframes, supercomputers, desktop computers, storage devices, displays and other peripherals at fast data rates. Fibre Channel is especially suited for connecting computer servers to shared storage devices and for interconnecting storage controllers and drives.

Fibre channel provides an active intelligent interconnection scheme, called a fabric, to connect devices. Fibre channel ports only have to manage a simple point-to-point connection between itself and another fibre channel device. Fibre Channel Protocol (FCP) predominantly transports Small Computer System Interface (SCSI) commands over Fibre Channel networks.

A proxy is a device that acts as an intermediary among two or more devices. Proxies can be used for improving performance, load balancing, management, or adding new functionality. Proxy behavior can be defined as either transparent or non-transparent. A transparent proxy is one for which the proxied devices see no operational difference in their interaction before and after the proxy is interjected. Devices connected through a non-transparent proxy may see no operational difference but may incur some behavioral differences, especially concerning the temporal sequence of events.

BRIEF DESCRIPTION OF THE DRAWINGS

FIG. 9 shows a fibre channel connection between a target and the storage fabric.

FIG. 10 shows how the fibre channel proxy is connected between the target and the storage fabric.

FIG. 11 shows two storage fabrics coupled between an initiator and a target.

FIG. 12 shows how two fibre channel proxies are connected between the initiator and the two storage fabrics of FIG. 11.

DETAILED DESCRIPTION OF THE DRAWINGS

Several preferred examples of the present application will now be described with reference to the accompanying drawings. Various other examples are also possible and practical. This application may be exemplified in many different forms and should not be construed as being limited to the examples set forth herein.

A fibre channel proxy is described below that can be deployed into a fibre channel without requiring reconfiguration of the fibre channel initiator or fibre channel target.

Figure 1:
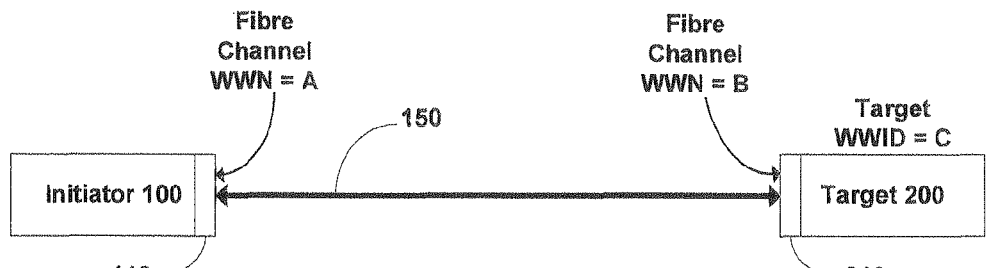
FIG. 1 shows two devices coupled together over a fibre channel network.

FIG. 1 shows a fibre channel 150 connected between an initiator 100 and a target 200. For clarify and explanation purposes terms initiator and target will generally be used in the singular form. However, it should be understood that unless otherwise explained, whenever an initiator, target, or fibre channel proxy is described below, it may refer to either a single or multiple initiators, targets, or fibre channel proxies, respectively.

For example, the initiator 100 in FIG. 1 could be one or more servers, server applications, routers, switches, client computers, etc. The target 200 could be one or more storage devices or storage servers that contain storage devices and/or storage discs.

Each initiator 100 and target 200 operates fibre channel interface cards or Host Bus Adapters (HBA) 110 and 210, respectively. The fibre channel HBAs allow the initiator 100 and target 200 to communicate over the fibre channel medium 150 using the fibre channel protocol. Each physical port on each HBA 110 and 210 has a unique World Wide Name (WWN) and World Wide Identifier (WWID) for the storage behind it, the prior being similar to an Ethernet Media Access Control (MAC) address. The combination of WWN and WWID are unique identifiers which identify a particular fibre channel, Advanced Technology Attachment (ATA) or Serial Attached SCSI (SAS) target.

In the example shown in FIG. 1, the world wide name for at least one of the initiators 100 is represented as WWN=A and the world wide name and worldwide identifier for at least one of the targets 200 is represented as WWN=B and WWID=C, respectively.

During fibre channel access control operations, the initiator 100 discovers the WWN and WWID for target 200 and the target 200 discovers the WWN for initiator 100. The initiator 100 and target 200 then use the WWNs and WWID for establishing a virtual connection over the fibre channel 150 and then transferring control and data commands.

Figure 2:
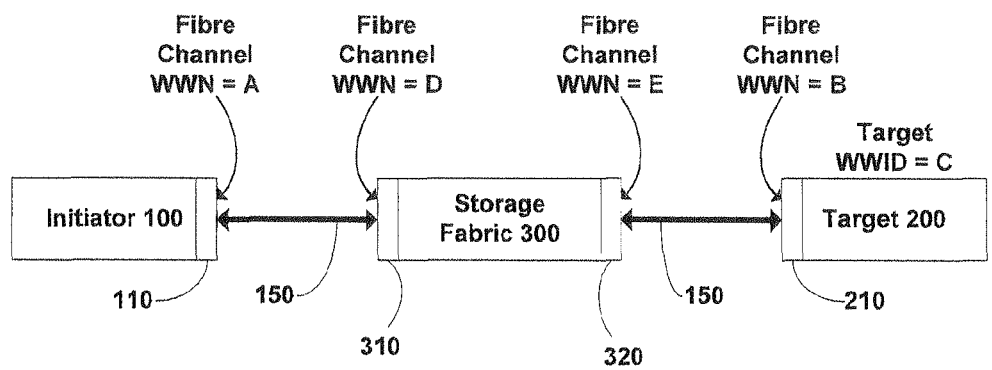
FIG. 2 shows the two devices in FIG. 1 connected together through a storage fabric.

FIG. 2 shows another fibre channel configuration where the initiator 100 and target 200 are indirectly coupled together through a storage fabric 300. In one embodiment, the storage fabric 300 is a fibre channel fabric made up of a number of fibre channel switches. Fibre channel fabrics are know and are therefore not described in further detail.

In this example, a fibre channel interface 310 in storage fabric 300 is coupled to the initiator 100 and has a WWN=D.

Another fibre channel interface 320 in storage fabric 300 is coupled to the target 200 and has a WWN=E. Similar to FIG. 1, the initiator 100 discovers the WWN=D for fibre channel interface 310 in storage fabric 300 for establishing a fibre channel connection with the storage fabric 300. The target 200 similarly discovers the WWN=E of the fibre channel interface 320 for establishing a fibre channel connection with storage fabric 300. The initiator 100 then discovers the WWID=C of target 200 for establishing a virtual fibre channel connection with target 200 through storage fabric 300.

Figure 3:
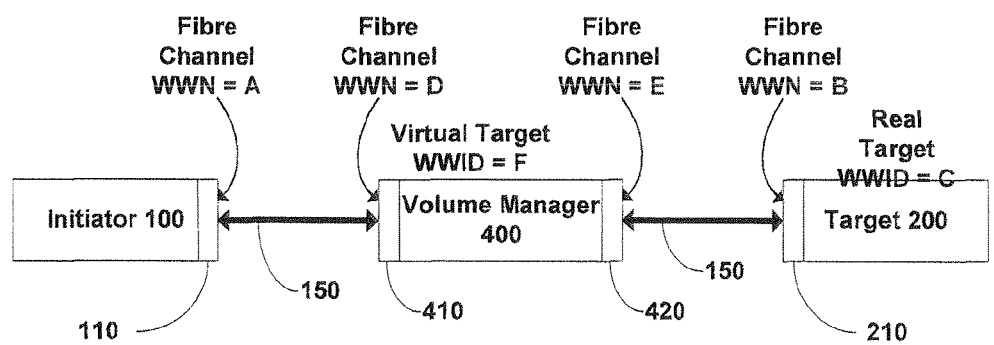
FIG. 3 shows the two devices of FIG. 1 coupled together through a volume manager.

FIG. 3 shows a fibre channel volume manager 400 deployed between the imitator 100 and the target 200. The volume manager 400 creates, assigns, manipulates, and generally manages many different storage subsystems represented by target 200. Similar to the storage fabric 300 shown in FIG. 2, the volume manager 400 uses a first WWN=D at a first fibre channel interface 410 to communicate over the fibre channel 150 with initiator 100 and uses a second WWN=E at a second fibre channel interface 420 for communicating with target 200. The volume manager 400 also has a target WWID=F used by the initiator 100 and target 200 when communicating over the fibre channel 150.

Note that the WWN=D, WWN=E and WWID=F used by volume manager 400 are different from the WWN=B and WWID=C used by the target 200 and different from the WWN=A used by the initiator 100.

The initiator 100 and target 200 have to reconfigure access control states whenever the volume manager 400 is inserted into the fibre channel 150. This can be a problem for storage systems that are expected to be in continuous operation. There can also be many hundreds of initiators 100, targets 200, and storage fabric switches 300 connected together. Often these devices are configured into different zones. It is very complex and very time consuming to reconfigure these different devices with a new network configuration associated with a newly deployed volume manager 400.

Figure 4:
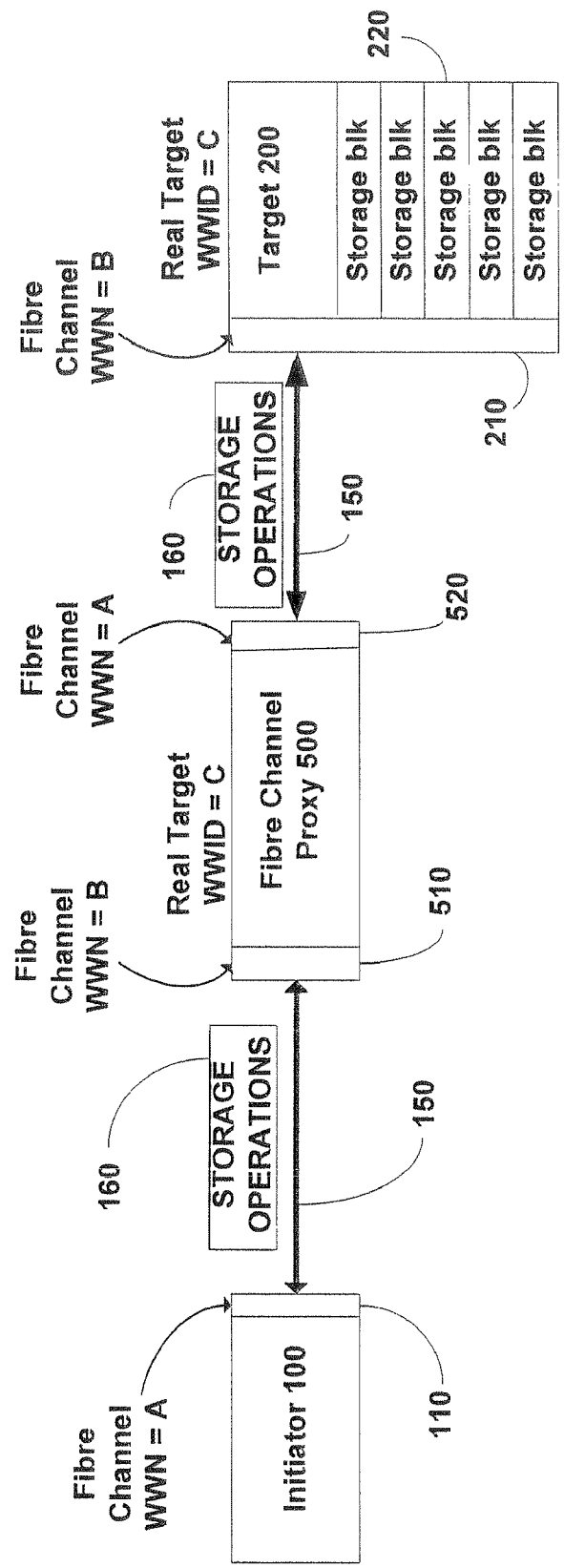
FIG. 4 shows the two devices connected together through a fibre channel proxy.

FIG. 4 shows a fibre channel proxy 500 deployed into the fibre channel 150 between the initiator 100 and the target 200. The proxy 500 will deploy transparently in the fibre channel 150 so that the initiator 100 or target 200 do not have to reconfigure their fibre channel access and control configurations.

The fibre channel 150 is a physical system capable of transporting the fibre channel protocol. The fibre channel protocol is used for transporting a block protocol such as SCSI. Virtually all deployed fibre channel storage consists of SCSI riding under fibre channel. Each fibre channel endpoint has a unique WWN name and each SCSI device has a unique WWID name.

In the case of a fibre channel storage fabric, the initiator 100 and target 200 do not see each other's WWN's, only those of the fabric/switch. In the case of the volume manager 400 in FIG. 3, not only are the WWN's for the fibre channel interfaces 410 and 420 different, but the storage device represented by the volume manager 400 is virtualized with a new WWID=F.

The fibre channel proxy 500 has the unique ability to maintain both the WWNs and WWIDs of all devices on the fibre channel 150. This allows the fibre channel proxy 500 to be deployed without changing the authorization and authentication configurations currently established in the fibre channel network. In other words, the deployment of the fibre channel proxy 500 in the fibre channel 150 is "transparent" to both the initiator 100 and target 200.

The initiator 100 is spoofed into thinking it is still connected to the same storage fabric 300 (FIG. 3) or target 200 it was previously connected to, prior to the deployment of proxy 500. The target 200 is spoofed into thinking it is still connected to the same initiator 100 or storage fabric 300 it was previously connected to, prior to the deployment of proxy 500.

After deployment, the fibre channel proxy 500 receives storage operations 160 from one or more initiators 100 over one or more fibre channel ports 510 and forwards the storage operations 160 to one of more storage targets 200 over one or more fibre channel storage ports 520. The fibre channel proxy 500 maps storage access locations identified in the storage operations 160 received from the initiator 100 to different storage blocks 220 in the target 200. However, the proxy interface 510 uses the WWN=B of target 200 to communicate with the initiator 100 during the fibre channel storage operations 160. The proxy interface 520 also uses the WWN=A of the initiator 100 to communicate with the target 100 during the fibre channel storage operations 160.

The proxy 500 incorporates and uses the WWN=A of the fibre channel initiator port 110 and the WWN=B of the fibre channel target port 210 transparently without any reconfiguration of state information in either the initiator 100 or target 200. This provides the substantial advantage of allowing the quick deployment of proxy 500 anywhere within the storage network while also improving the performance of storage operations 160.

Figure 5:
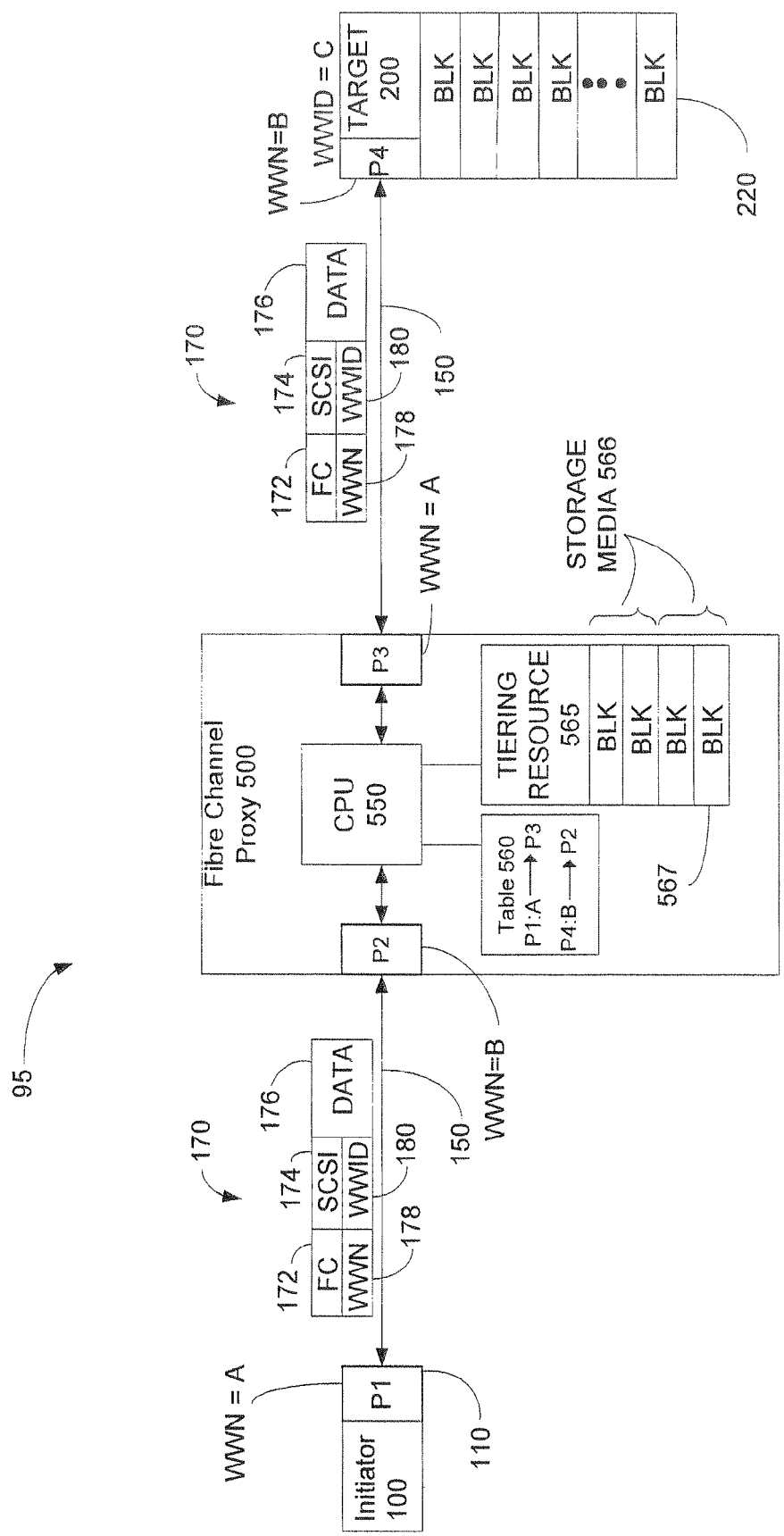
FIG. 5 shows the fibre channel proxy of FIG. 4 in more detail.

FIG. 5 describes in more detail how the fibre channel proxy 500 obtains and uses the fibre channel World Wide Names (WWN) and World Wide IDentifiers (WWID) of the initiator 100 and target 200 after being deployed in fibre channel 150.

The initiator 100, proxy 500, and target 200 send commands 170 using a fibre channel protocol 172. At least in some embodiments, the fibre channel protocol 172 is encapsulated under another Ethernet, Internet Protocol (IP) or Transaction Control Protocol (TCP). A second protocol 174, such the SCSI, is transported within the fibre channel protocol 172.

A Central Processing Unit (CPU) or other processor 550 in proxy 500 monitors the commands 170 sent by the initiator 100 and target 200. Access operations performed during the fibre channel protocol 172 identify the WWNs 178 of the initiator 100, target 200, or storage fabric 300 (FIG. 2). The access operations performed in the SCSI protocol 174 identify the WWIDs 180 of the initiator 100, target 200, or storage fabric 300.

The WWNs 178 and WWID device identifiers 180 of the initiator 100 and target 200 are identified by the processor 550 and then mapped into a table 560. The WWN 178 of the initiator 100 is then used by the processor 550 to perform authentication and authorization with the target 200 on behalf of the initiator 100. The WWN 178 of the target 200 is also used by the processor 550 to perform authentication and authorization with the initiator 100 on behalf of the target 200.

Access control in fibre channel 150 is set up according to the WWN and physical port name of the initiator 100 and target 200. Thus, one advantage of the fibre channel proxy 500 is that whatever access control is set up prior to deployment of fibre channel proxy 500 is still valid after deployment of the fibre channel proxy 500.

This is different from other fibre channel devices installed into an existing fibre channel network. With other fibre channel devices, the initiator 100 would no longer see the same target 200 and the target 200 would no longer see the same initiator 100. Thus, each initiator 100 and target 200 would have to perform a new access set up.

The transparent proxy 500 improves the overall performance of the fibre channel storage system while allowing the initiator 100 and target 200 to maintain previous access control configurations. For example, a current access control configuration may allow the target 200 to ignore all fibre channel traffic, except for one specifically configured initiator 100. The proxy 500 allows the target 200 to maintain a current access control configuration, after the proxy 500 is deployed in the fibre channel 150. Thus, the target 200 can continue to ignore unrelated fibre channel traffic.

Fibre channel ports for different devices can also be configured to belong to different zones. The fibre channel proxy 500 does not require manual reconfiguration of the different zoning policies that would normally be required with the deployment of a new fibre channel device.

Access Control

Prior to the proxy 500 being installed, in a conventional fibre channel registration phase, the initiator 100 powers up and attempts to register on the fibre channel 150 using the fibre channel protocol 172. The registration requests connections to any other devices connected to the initiator 100. This is referred to generally as access control. The target 200 either allows or declines the registration request. If the connection is allowed by the target 200, a point to point connection is established between the initiator 100 and target 200.

Once the point-to-point connection is established, the SCSI protocol 174 is used to search or discover available Logical Unit Numbers (LUNs)/disks in the targets 200 that are willing to connect to the initiator 100. The initiator 100 then establishes logical data connections with the available LUNs/disks. The SCSI protocol 174 is used for mounting available disks, mounting file systems on the disks, and issuing read and write commands.

Figure 6:
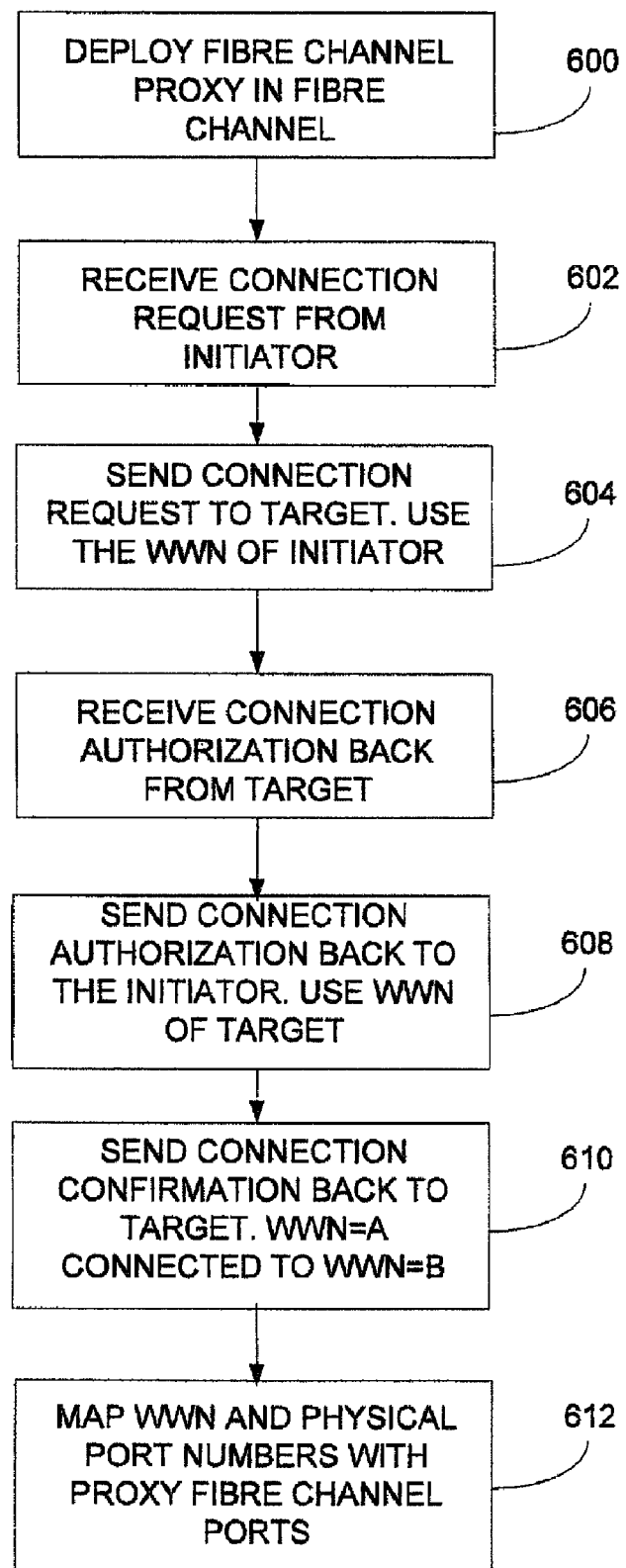
FIG. 6 is a flow diagram explaining in further detail the operations performed by the fibre channel proxy.

FIG. 6 shows a flow diagram describing how access control is performed with the fibre channel proxy 500 shown in FIG. 5. The fibre channel proxy 500 is deployed between the initiator 100 and target 200 in operation 600. The initiator 100 powers up and sends a registration request command 170 to the proxy 500 requesting connection in operation 602. The registration request is the same as any other fibre channel request performed during any normal fibre channel registration.

The registration request contains the WWN 178 of initiator 100 which in this example is WWN=A. The proxy 500 holds off responding to the initiator request 170 for a while, and in operation 604 sends a registration request to the target 200 asking for a connection. However, the registration request sent by the proxy 500 uses the WWN=A of initiator 100.

The proxy 500 in operation 606 receives back a response from the target 200 allowing the connection and providing the WWN 172 of the target 200. In this example, the target 200 has a WWN=B. The proxy 500 temporarily holds off sending a confirmation response back to the target 200, and in operation 608 sends an authorization reply back to the initiator 100 allowing the initiator connection request. However, the authorization reply sent back to the initiator 100 contains the WWN=B of target 200. The proxy 500 in operation 610 then sends a fibre channel confirmation back to target 200 confirming initiator WWN=A is now connected to target WWN=B.

The proxy 500 in operation 612 maps into table 560 the different physical port numbers and WWN values discovered for the initiator 100 and target 200 with different fibre channel ports in the proxy 500. For example, physical port 1 and WWN=A for initiator 100 is mapped to fibre channel port P3 in the proxy 500 and physical port 4 and WWN=B for target 200 is mapped to fibre channel port P2 in proxy 500. The processor 550 then forwards any commands received from the target 200 to port P2 and forwards any commands received from initiator 100 to port P3. The initiator 100 and target 200 operate in exactly the same manner as if they were directly connected together over the same fibre channel cable.

The initiator 100 may then ask the target 200 what LUNs/disks are available via the SCSI protocol 174 in commands 170. The proxy 500 forwards the LUN/disk requests to the target 100 over port 3. The target 200 responds back with SCSI messages 174 in commands 170 identifying available LUNs. The proxy 500 forwards the SCSI response to the initiator 100 over port 2. The initiator 100 then chooses to mount and configure particular LUNs/disks in target 200 as storage.

The proxy 500 notifies any connected devices when a link goes down. For example, if the fibre channel link between initiator 100 and proxy 500 goes down, the proxy 500 notifies the target 200 of the disconnect. Thus, the target 200 will operate as if the link between the proxy 500 and target 200 actually went down. This further replicates a direct point-to-point connection between the initiator 100 and target 200.

Figure 7:
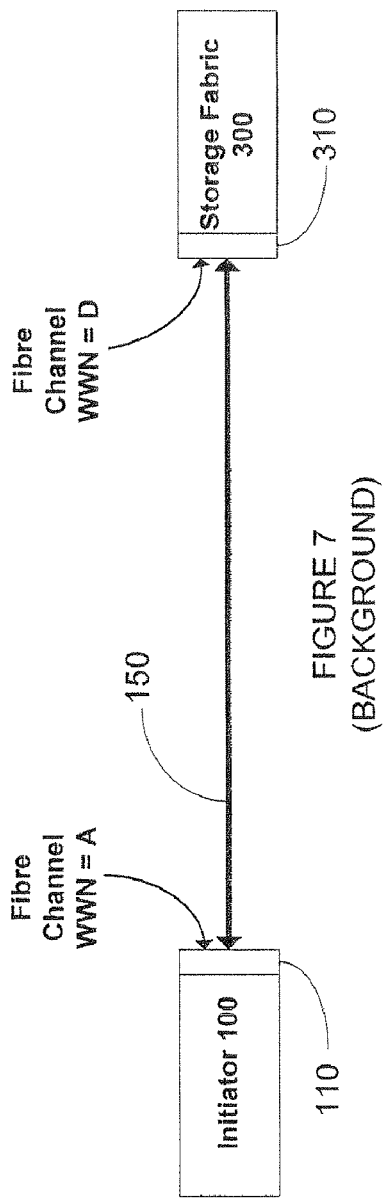
FIG. 7 shows a fibre channel connection between an initiator and a storage fabric.

FIG. 7 shows a conventional fibre channel connection between the initiator 100 and a storage fabric 300. In this example, the initiator 100 has a fibre channel port 110 with a WWN=A and the storage fabric 300 has a fibre channel port 310 with a WWN=D.

Figure 8:
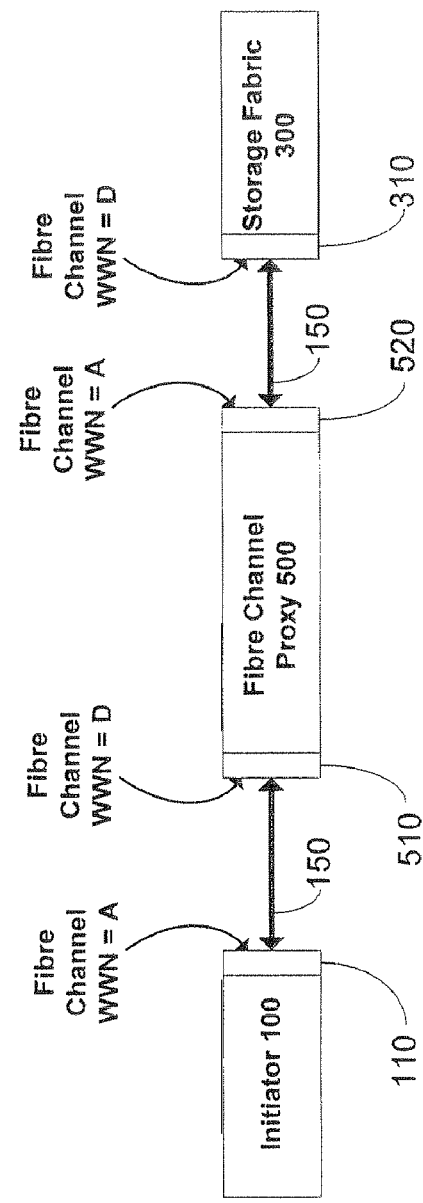
FIG. 8 shows how the fibre channel proxy is connected between the initiator and the storage fabric.

FIG. 8 shows how the fibre channel proxy 500 can be connected between one or more of the initiators 100 and the storage fabric 300. In this configuration, the proxy 500 uses the WWN=D currently being used by the storage fabric 300 for communicating over the fibre channel 150 with the initiator 100 and uses the WWN=A currently being used by the initiator 100 for communicating over the fibre channel 150 with one of the targets 200.

In this configuration, the initiator 100 will act as though it is communicating directly with the storage fabric 300 and the storage fabric 300 with act as though it is communicating directly with the initiator 100.

FIG. 9 shows a conventional fibre channel connection 150 between target 200 and the storage fabric 300. In this example, target 200 has a fibre channel port 210 with a WWN=B that connects to a fibre channel port 320 with a WWN=E on the storage fabric 300.

FIG. 10 shows how the fibre channel proxy 500 is connected between one or more of the targets 200 and the storage fabric 300. In this configuration, the proxy 500 uses the WWN=E currently being used by port 320 in storage fabric 300 to communicate over the fibre channel 150 with the target 200. The proxy 500 uses the WWN=B currently being used by port 210 in target 200 to communicate over the fibre channel 150 with the port 320 in storage fabric 300. In this configuration, the target 200 will act as though it is communicating directly with the storage fabric 300 and the storage fabric 300 with act as though it is communicating directly with the target 200.

The same access control process described above in FIG. 6 may be performed between the storage fabric 300, proxy 500, and target 200 for identifying the WWN and WWIDs and for establishing connections between the different devices.

For example, the target 200 may power up and send a connection request in a command 170 to proxy 500. The proxy 500 receives the request and holds off replying to target 200 while sending the connection request in a fibre channel command 170 to the storage fabric 300. The command 170 contains the WWN=B of target 200. The proxy 500 receives a reply back from the storage fabric 300 that allows the connection and includes the WWN=E for port fibre port 310 in storage fabric 300. The proxy 500 then sends a replay back to the target 200. The replay allows a fibre channel connection between proxy 500 and target 200 but uses the WWN=E of storage fabric 300.

FIG. 11 shows a conventional fibre channel configuration where two different storage fabrics 300 and 350 are connected between one or more initiators 100 and targets 200. In this example, the storage fabrics 300 and 350 have fibre channel ports 310 and 360, respectively, coupled to the fibre channel port 110 on the initiator 100. Port 310 has WWN=D and port 360 has WWN=F. Storage fabrics 300 and 350 have fibre channel ports 320 and 370 coupled to the fibre channel port 210 on target 200. Fibre channel port 320 has a WWN=E and port 360 has a WWN=G.

FIG. 12 shows one embodiment where two different fibre channel proxies 500 and 570 are deployed between the initiator 100 and the storage fabrics 300 and 350, respectively. The proxy 500 uses the WWN=D at port 510, which is also used by storage fabric 300, for communicating with initiator 100. The proxy 570 uses the WWN=F at port 580, which is also used by storage fabric 350, for communicating with initiator 100. Each of the proxies 500 and 570 use WWN=A at ports 520 and 590, respectively, to communicate over the fibre channel 150 with the storage fabrics 300 and 350, respectively.

Figure 13:
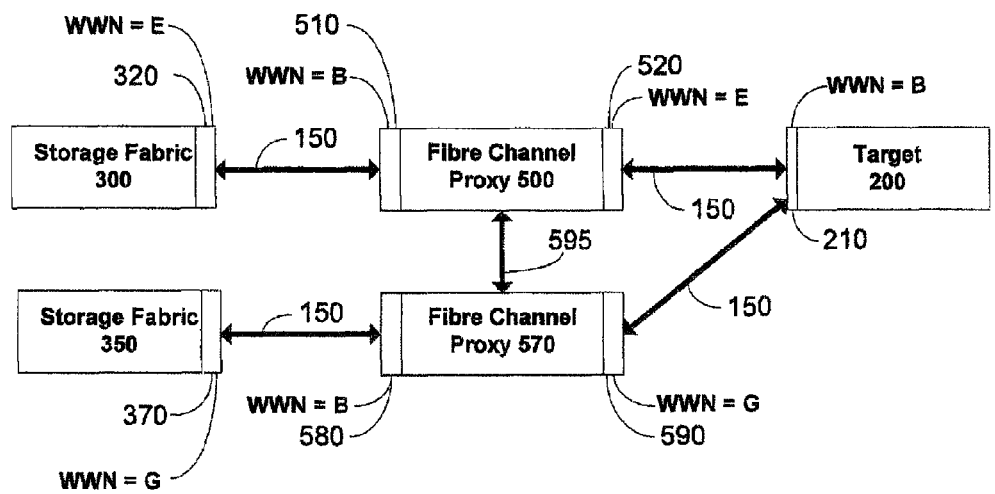
FIG. 13 shows how the two fibre channel proxies are connected between the target and the two storage fabrics of FIG. 11.

FIG. 13 shows another embodiment where the two different fibre channel proxies 500 and 570 are deployed between the target 200 and the storage fabrics 300 and 350, respectively. The proxy 500 uses the WWN=E at port 520, also used by storage fabric 300, for communicating with the target 200. The proxy 570 uses the WWN=G at port 590, also used by storage fabric 350, for communicating with the target 200. Each of the proxies 500 and 570 use the WWN=B at ports 510 and 580, respectively, when communicating over the fibre channel 150 with the storage fabrics 300 and 350, respectively.

In both FIGS. 12 and 13, a connection or bus 595 is coupled between the two proxies 500 and 570. Fibre channel state information is exchanged over connection 595 to main coherency between proxies 500 and 570. For example, a particular target 200 connected to proxy 500 may go down. Proxy 500 relays the information regarding the disconnected target 200 to proxy 570 over connection 595. In another example, one of the initiators 100 connected to proxy 570 may initiate a connection to a particular target 200. The proxy 570 relays the connection information to proxy 500 over bus 595. This allows the two proxies 500 and 570 to maintain a coherent view of state of every endpoint connection.

Figure 14:
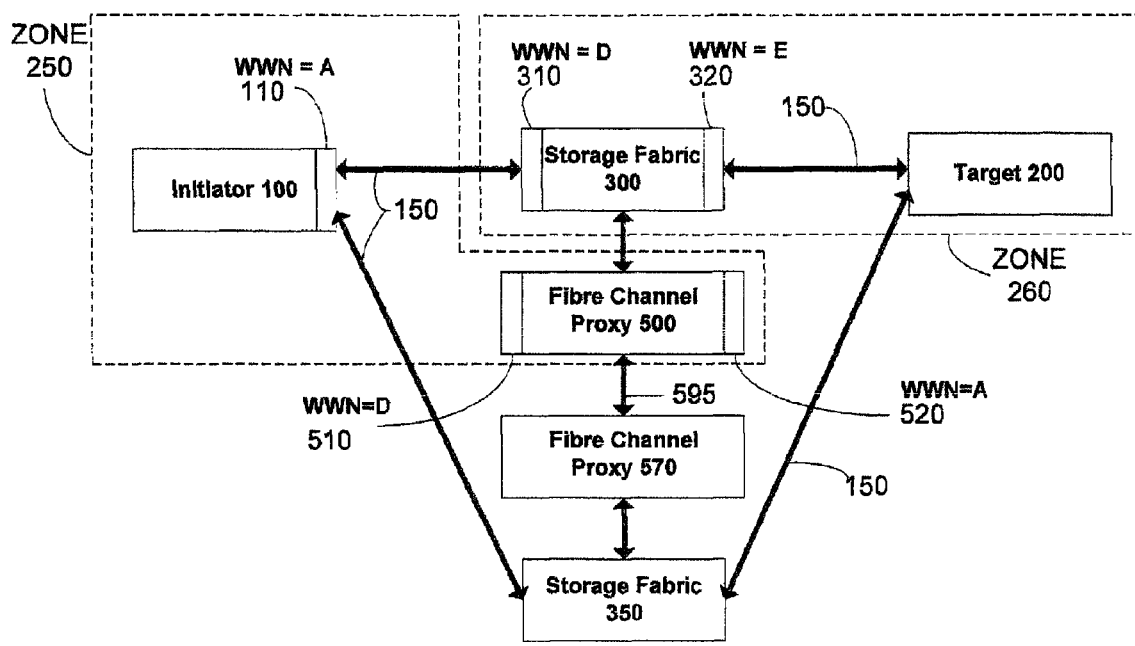
FIG. 14 shows how two fibre channel proxies are connected between the two storage fabrics of FIG. 11.

FIG. 14 shows a high availability fibre channel configuration. In this embodiment the two proxies 500 and 570 are coupled in series between the two storage fabrics 300 and 350. The connection 595 is again used to maintain coherency between the two proxies 500 and 570 as described above.

In this embodiment, the fibre channel proxies 500 and 570 do not create any physical separation between initiators 100, targets 200, and/or storage fabrics 300 and 350 as shown above. Alternatively, the proxies 500 and 570 are logically deployed between the different fibre channel devices 100, 200, 300, and/or 350 using fibre channel zoning.

Typically it is a violation of the fibre channel protocol for two devices to have the same WWN value. For example, in the configuration in FIG. 14, it would typically be a violation for storage fabric 300 and fibre channel proxy 500 to both use WWN=D in fibre channel ports 310 and 510, respectively, to connect to initiator 100. However, the storage system in FIG. 14 is configured so that storage fabric 300 and fibre channel proxy 500 reside in different zones 260 and 250, respectively.

In this manner, fibre channel port 510 of proxy 500 is logically the only port using WWN=D in zone 250 and fibre channel port 310 in storage fabric 300 is logically the only port using WWN=D in zone 260. Accordingly, the fibre channel proxy 500 will logically operate as if it was coupled in-between initiator 100 and storage fabric 300. All other fibre channel access control operations are the same as described above. For example, the fibre channel proxy 500 will obtain and then use the fibre channel port WWN=D of storage fabric 300 for communicating with initiator 100 and will use the fibre channel port WWN=A of initiator 100 to communicate with the storage fabric 300.

Storage Operations

Referring back to FIG. 5, in one embodiment, proxy 500 provides increased storage performance to initiator 100 through the utilization of the tiering resource 565. Tiering resource 565 holds selected portions 567 of virtual disks within proxy 500 so that requests for these data locations can be served faster than an corresponding request sent to target 200. In one embodiment, tiering resource 565 resides entirely within proxy 500. In another embodiment, tiering resource 565 consists of internal and external media, the latter directly connected to proxy 500. In another embodiment, tiering resource 565 may reside within a plurality of different proxies 500 and 570 configured and connected as a cluster of appliances.

Tiering resource 565 is managed by a mapping engine (not shown) which maintains a listing of the storage from virtual disks currently present within proxy 500 and the location within tiering resource 565 in which said storage is maintained. The mapping engine exposes this mapping to proxy 500 via an application interface that supports operations such as block lookup, block insertion and block removal. In one embodiment, the mapping engine independently manages tiering resource 565 without interaction with other components of proxy 500. In another embodiment, mapping engine requests tiering resources 565 and maintains only pointers to the tiering resource 565 without controlling availability or recovery.

Some embodiments of the proxy engine, mapping engine, and a tiering resource are described in more detail in Provisional Application Ser. No. 61/183,912; filed on Jun. 3, 2009; entitled MAPPING ENGINE FOR STORAGE DEVICE, which is herein incorporated by reference in its entirety.

Figure 15:
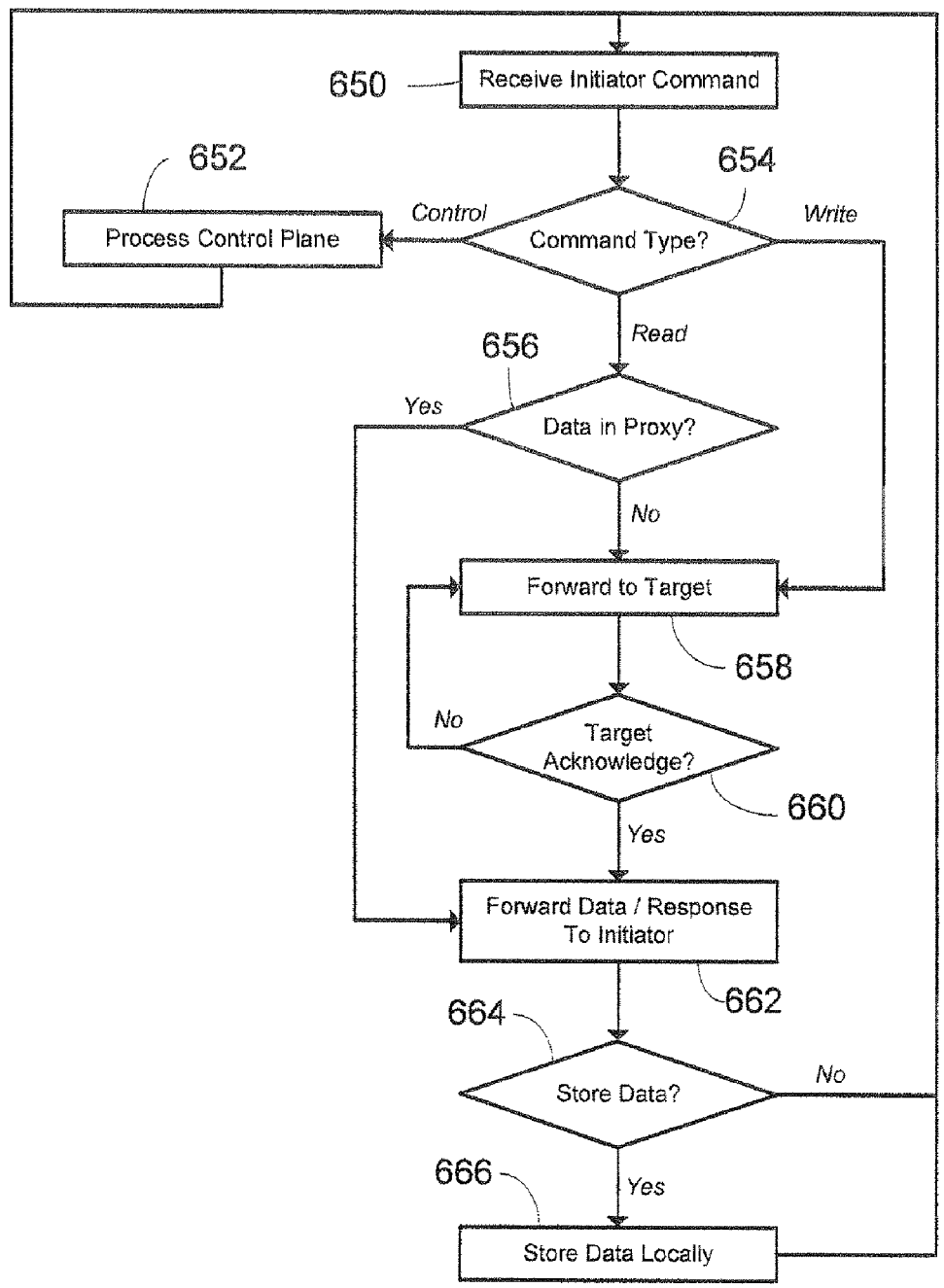
FIG. 15 is a flow diagram showing how the fibre channel proxy operates after being deployed in a fibre channel network.

FIG. 15 describes in further detail how the fibre channel proxy 500 operates in this storage environment after completing fibre channel access control operations with the initiator 100 and target 200 as previously described above. Referring to both FIGS. 15 and 5, typically three types of operations are performed in a storage system 90; read operations, write operations, and control operations. The proxy 500 receives a command 170 from the initiator 100 in operation 650. The particular type of read, write, or control command is determined in operation 654. As described above, the proxy 500 uses the WWN=B of the target 200 to receive commands 170 from the initiator 100 and uses the WWN=A of the initiator 100 to forward commands 170 to the target 200.

Any control type SCSI command 170 is forwarded directly to the target 200 in operation 652 over a process control plane typically without further interpretation by the proxy 500. Any SCSI write commands 170 identified in operation 654 are written into storage blocks 220 in the targets 200. However, the proxy 500 does not immediately send an acknowledge of the write command back to initiator 100. The write command 170 is first forwarded to the target 200 in operation 658. The proxy 500 then waits for an acknowledgement back from the target 200 in operation 660. After receiving the acknowledge from the target 200, the proxy 500 in operation 662 sends the acknowledge command back to the initiator 100 confirming the write operation has been completed.

At least temporarily, the proxy 500 retains a copy of the data that was written into target 200. In operation 664, the proxy 500 determines if the same data should also be written into the tiering resource 565. If so, the proxy 500 in operation 666 stores a local copy of the data in the tiering resource 565.

When a read command 170 is received in operation 654, the proxy 500 in operation 656 first determines if the address associated with the read command corresponds with an local data in tiering resource 565. If the data is currently located in the tiering resource 565, the proxy 500 returns the local data from tiering resource 565 to the initiator 100 in operation 662.

If the address associated with the read command is not associated with any local data in tiering resource 565, the proxy 500 forwards the read command to the target in operation 658. The proxy 500 waits for an acknowledgment back from the target 200 in operation 660 and then responds back to the initiator 100 with the data in operation 662. The proxy 500 makes a determination in operation 664 weather or not to store the storage data 220 locally in tiering resource 565. The proxy 500 either returns to operation 650 or stores the storage data locally in tiering resource 565 in operation 666.

The tiering resource 565 in proxy 500 may comprise local storage blocks 567 within one or more local storage media 566. The local storage blocks 567 may be deleted by the proxy 500 after a predetermined time period. The predetermined time period may be a constant time interval that can be extended for particular local storage blocks 567 after read operations to those particular local storage blocks. Alternatively, particular local storage blocks 567 may be immediately removed following certain read operations to those particular local storage blocks 567. The time interval can also be dynamically varied according to access patterns of the storage blocks 220 by the initiator 100.

The read commands 170 may also be mapped by the proxy 500 to virtual storage addresses that contain a reference that identifies the particular type of local storage media 566. For example, the virtual storage address may identify a particular Dynamical Random Access Memory (DRAM), Flash, or disk device 566 either internal or external to the tiering resource 565. The virtual storage address may also provide an address within that particular storage media 566.

In at least one embodiment, the virtual storage addresses are address offsets into a local DRAM in the tiering resource 565. The virtual storage addresses can also use an indirection table that associates different ranges of virtual storage addresses with different types of local media 566.

In one embodiment, the proxy 500 provides an abstraction of physical disks as virtual disks. The physical disks and virtual disks may be identical in size and configuration. In another embodiment, virtual disks consist of stripes across physical disks in target 200 so that each virtual disk consists of individual portions of a plurality of physical disks.

Zoning

Figure 16:
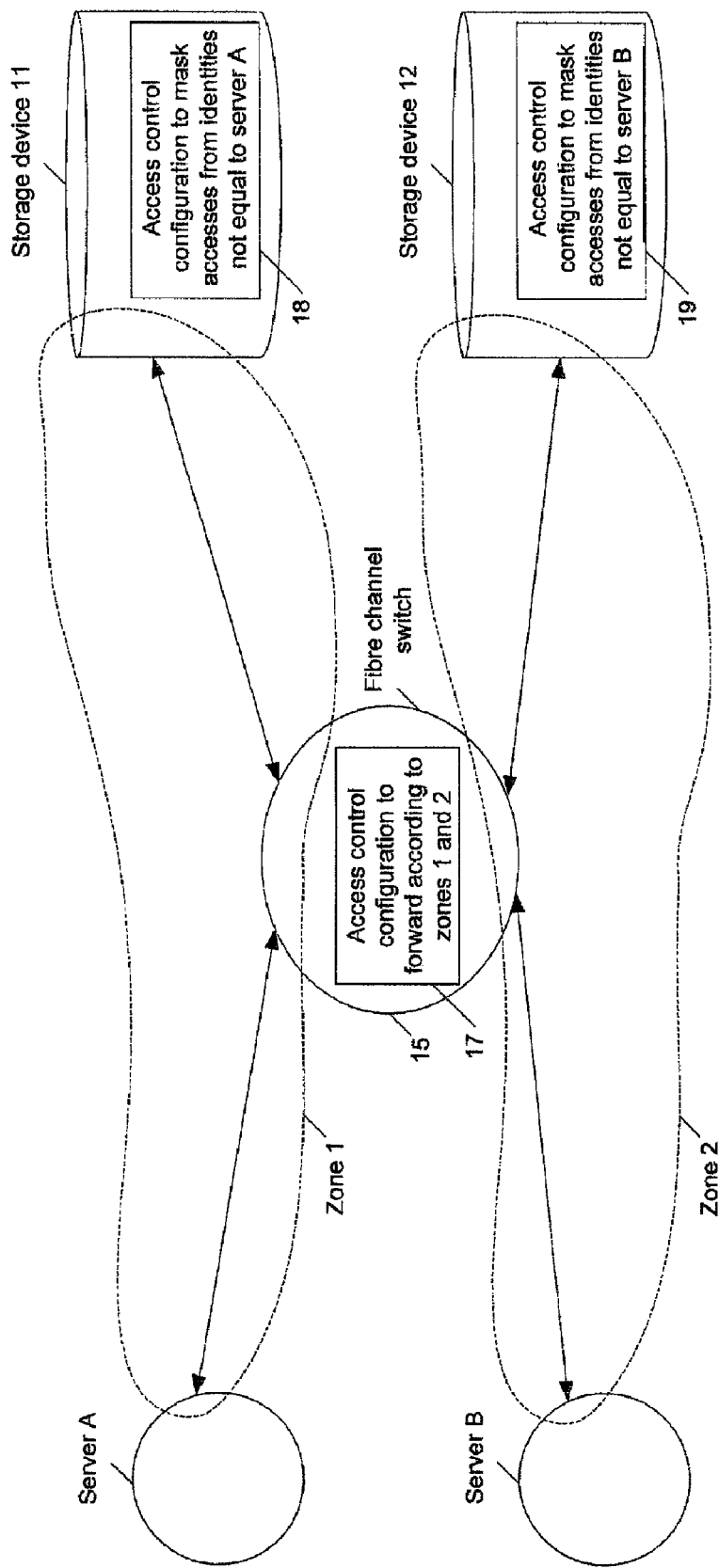
FIG. 16 shows a network configured with access control mechanisms that secure data stored on storage devices.

FIG. 16 illustrates a network configured with access control mechanisms that secure data stored on the storage devices. A Storage Area Network (SAN) can include servers A and B for operating various applications. The applications communicate with disk-based remote storage devices 11 and 12 to manipulate data stored thereon. Generally, the communications are routed through one or more switching devices, such as the fibre channel switch 15.

The network can be configured with an access control scheme. One type of access control is called zoning and is enforced by the fibre channel switch 15. An administrator defines zones that represent different logical groups of devices, or even different logical groups of ports on the devices. The fibre channel switch 15 then restricts communications between devices and/or ports according to the logical groupings.

To better understand zoning type access control, refer to FIG. 16 showing the zone 1 including the server A and the storage device 11 and the zone 2 including the server B and the storage device 12. The fibre channel switch 15 prevents server B, which is outside the zone 1, from communicating with the storage device 11. Similarly, the fibre channel switch 15 prevents server A, which is outside the zone 2, from communicating with the storage device 12.

Another type of access control is called masking and is enforced by the storage devices 11 and 12. An entity on the storage device 11 masks commands to manipulate or read data on the storage device 11 unless the commands are sent from a device contained in a mask group defined by the access control configuration 18. For example, the entity might mask commands from identities other than server A's identity. Similarly, an entity on the storage device 19 masks communications according to the access control configuration 19. One type of masking is Logical Unit Number (LUN) masking; however, the term masking refers to any type of authorization process that can be used to filter commands at an endpoint.

Although these access control configurations 17-19 are helpful for securing a network, the administrative burden for reconfiguring the zoning and the masking is relatively high. This high administrative burden can potentially frustrate the addition of new devices into the network.

One example of a new device that can be easily integrated into the network but for the high administrative cost of reconfiguring the zoning and the masking access control configurations 17-19 is a network cache, which in the present example includes Dynamic Random Access Memory (DRAM). The network cache can operate as an intermediary between the servers A and B and the storage devices 1 and 2 providing better access times and/or throughput to cached data. Although the network cache can be added to the network through reconfiguration of the access control configurations 17-19, it would be preferable to add the network cache while avoiding reconfiguration.

Figure 17:
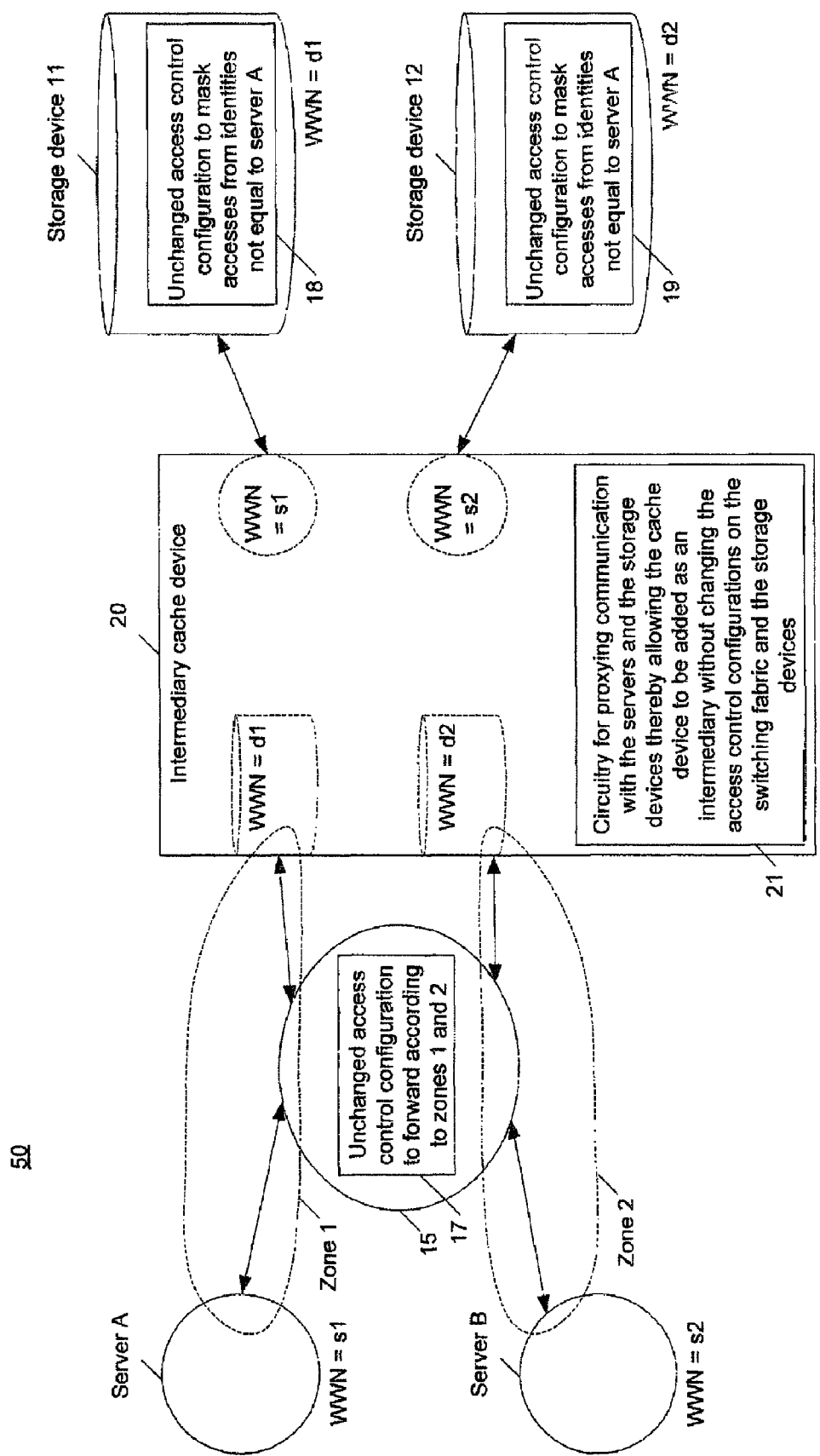
FIG. 17 shows an intermediary cache device added to the network shown in FIG. 16 without requiring reconfiguration of the access control mechanisms.

FIG. 17 illustrates an intermediary cache device added to the network shown in FIG. 16 without requiring reconfiguration of the access control mechanisms.

The system 50 includes an intermediary cache device 20 containing circuitry 21 to proxy communications with the servers and the storage devices. This proxy function allows the intermediary cache device 20 to be integrated into the network described with reference to FIG. 16 without changing the access control configurations 17-19.

Still referring to FIG. 17, on the application side the circuitry 21 advertises the identity of the intermediary 20 as the World Wide Name (WWN) identities d1 and d2 to the switch 15. Based on the advertised identities, the switch 15 will pass communications from zone 1 and 2 devices (the servers A and B) to the intermediary 20, and will not block communication from the intermediary to the zone 1 and 2 devices (the servers A and B). Accordingly, it should be appreciated that the intermediary 20 can then act on behalf of the server A and B applications, controlling the storage devices 1 and 2 according to the commands received from the applications.

On the storage side, the proxy function advertises the identity of the intermediary 20 as the WWN identity s1 to the storage device 11. Based on this advertisement, the entity operating on the storage device 11 will not mask communications from the intermediary 20, which provides the intermediary 20 access to the data stored on the device 11. Similarly, the identity of the intermediary 20 is advertised as the WWN identity s2 to the storage device 12. Accordingly, it should be appreciated that this access allows the intermediary 20 to read and manipulate the stored data on behalf of the server A and B applications.

It should be apparent that the intermediary 20 advertises another's devices globally unique identity on the application side, the storage side, or both. This advertising allows the intermediary 20 to be installed on a network without reconfiguring an access control scheme on the network (whether that access control scheme includes zoning, masking, or both).

If the intermediary 20 is be integrated into networks that operate with masking but not zoning, the intermediary 20 can advertise its own local WWN identity on one side of the network while advertising a remote identity on the other side. For example, if there is no zoning it may be possible for the intermediary to advertise its own local WWN identity on the application side.

It should be appreciated that the example of the intermediary 20 operating as a network cache is for illustrative purposes only and is not intended to limit the present disclosure. It is both possible and practical to apply the principals described herein so that other intermediaries besides network caches can operate between applications and remote data stores.

Figure 18:
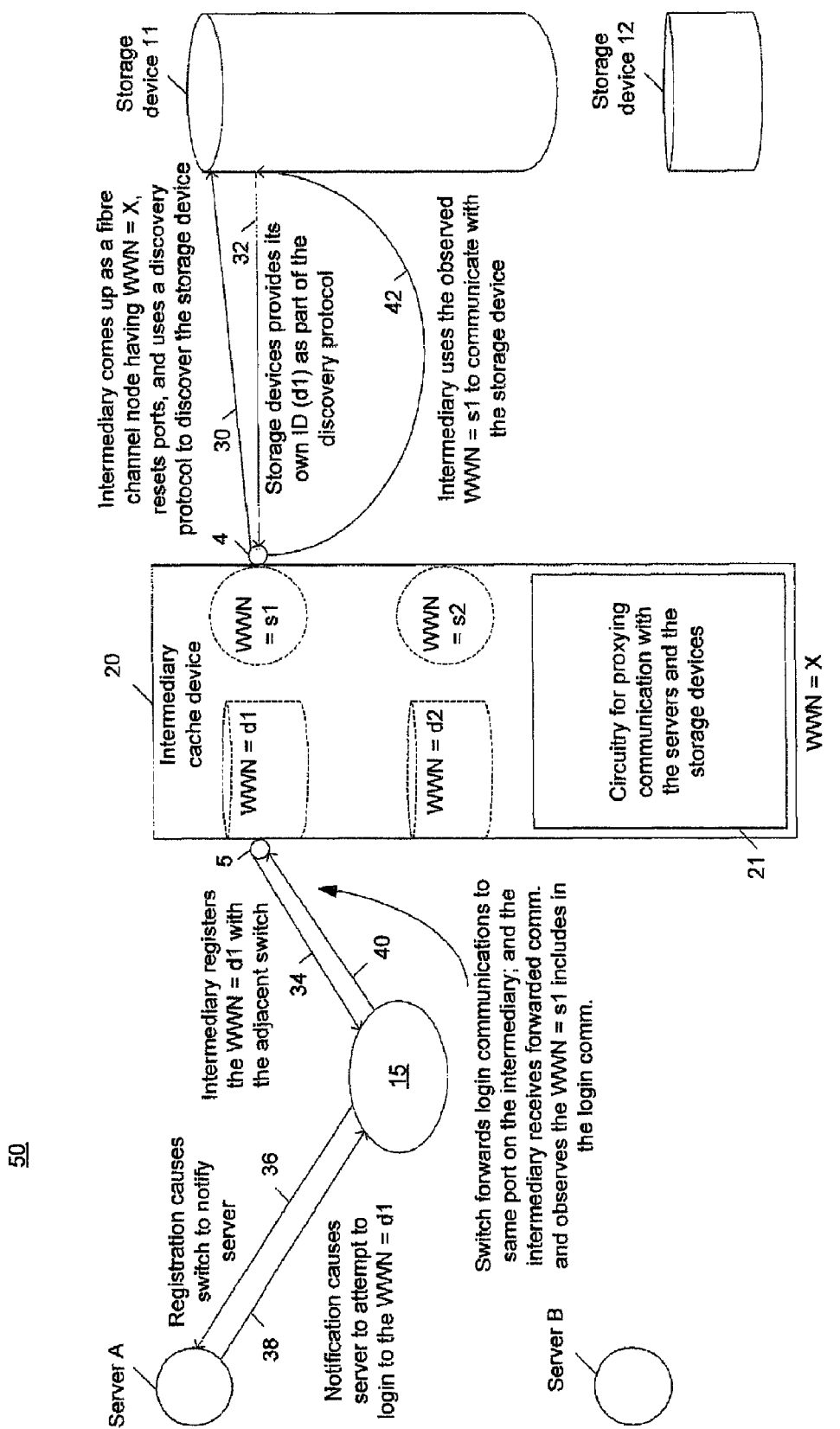
FIG. 18 shows how the intermediary cache device shown in FIG. 17 initializes for operating on the network independently of reconfiguration of the access control mechanisms.

FIG. 18 illustrates how the intermediary cache device shown in FIG. 17 initializes for operating on the network independently of reconfiguration of the access control mechanisms.

In order to advertise remote identities, the intermediary 20 first learns the identities of the remote devices. Although it may be possible for an administrator to provision the intermediary 20 with the identities of the remote devices, it is preferable for the intermediary 20 to glean these identities through an automated process. The intermediary 20 described with reference to FIG. 17 may glean these remote identities during initialization as described below. However, it should be understood that the below-described initialization process is explained for illustrative purposes only. The intermediary cache may obtain the identities of remote devices and advertises these identities using other mechanisms besides the mechanism described below with reference to FIG. 18.

Still referring to FIG. 18, the intermediary 20 initializes as a fibre channel node having the local WWN identity X. The intermediary 20 initializes a discovery protocol on the storage side, for example, by port resetting. During the discovery protocol the device 20 sends communications 30 using the WWN identity X. This is the last time during the described initialization example that the intermediary 20 will use the local WWN identity X. The intermediary 20 receives back the discovery protocol communications 32 identifying the WWN identity d1 of the storage device 11.

The circuitry 21 then causes the intermediary 20 to register (34) the obtained remote WWN identity d1 with the adjacent switch 15. The circuitry 21 associates the application side port 5 used to send the registration communications 34 with the storage side port 4 that was used to receive the communications 32.

According to the registration protocol, the switch 15 is caused to notify (36) the server A. Notification from the switch 15 causes the server to attempt to log into (38) the identity included in the notification. These communications 38 are forwarded to the port 5 because the circuitry 21 previously registered the identity WWN d1 with the switch 15 using this port 5.

The circuitry 21 observes the remote WWN identity s1 of the server A by analyzing the communications 40 received over the port 5. Thereafter, the circuitry 21 identifies itself in communications 42 sent over the associated port 4 using the obtained remote identity WWN identity s1.

It should be appreciated a similar process is performed to obtain and register the identity of the storage device 12 and to obtain the identity of the server B. Thus, the intermediary 20 will have a plurality application side ports registered with the switch 15 using different remote storage device identities to address zoning. Similarly, the intermediary 20 will have a plurality of storage side ports sending communications with different remote server identities to address masking.

The automated process described above can be triggered by an administrator physically connecting the intermediary 20 through links to the switch 15 and the storage devices 1 and 2 and by powering the intermediary 20. Thus, the intermediary 20 can be easily integrated into an existing network to provide improved application performance through network caching without reconfiguring an access control scheme on the network.

Several preferred examples have been described above with reference to the accompanying drawings. Various other examples of the application are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

The invention claimed is:
1. A fibre channel proxy, comprising:
a first set of one or more fibre channel proxy ports configured to receive storage operations from one or more initiators;
a second set of one of one or more fibre channel proxy ports configured to forward the storage operations to one or more storage targets; and a processor configured to:
  map storage access locations received in the storage operations from the one or more initiators to different storage blocks in the one or more storage targets;
  use fibre channel port identifiers of the one or more storage targets to communicate with the one or more initiators during the storage operations over the first set of fibre channel proxy ports; and
  use fibre channel port identifiers of the one or more initiators to communicate with the one or more storage targets during the storage operations over the second set of fibre channel proxy ports.

2. The fibre channel proxy according to claim 1, wherein the processor incorporates and uses the fibre channel port identifiers of the one or more initiators and the fibre channel port identifiers of the one or more storage targets during the storage operations transparently without any fibre channel access control reconfiguration of fibre channel ports in either the one or more initiators and the one or more storage targets.

3. The fibre channel proxy of claim 2, wherein the fibre channel port identifiers of the one or more initiators and the fibre channel port identifiers of the one or more storage targets comprise World Wide Name (WWN) values.

4. The fibre channel proxy of claim 1, wherein the one or more initiators, the fibre channel proxy, and the one or more storage targets communicate using a fibre channel protocol.

5. The fibre channel proxy of claim 4, wherein the fibre channel protocol is used by the one or more initiators, the fibre channel proxy, and the one or more storage targets over a fibre channel physical media.

6. The fibre channel proxy of claim 4, wherein the fibre channel protocol is encapsulated in at least one of Ethernet, Internet Protocol (IP) or Transmission Control Protocol (TCP).

7. The fibre channel proxy according to claim 1, wherein the processor is configured to:
  monitor communications between both the one or more initiators and the one or more storage targets;
  map unique device identifiers to the one or more initiators and to the one or more storage targets;
  use the unique device identifiers mapped to the one or more initiators to perform authentication and authorization with the one or more storage targets on behalf of the one or more initiators; and
  use the unique device identifiers mapped to the one or more storage targets to perform authentication and authorization with the one or more initiators on behalf of the one or more storage targets.

8. The fibre channel proxy of claim 7, wherein the unique device identifiers mapped to the one or more storage targets are defined by a second protocol transported by a fibre channel protocol.

9. The fibre channel proxy of claim 8, wherein the second protocol is a Small Computer System Interface (SCSI) protocol.

10. The fibre channel proxy of claim 9, wherein the unique device identifiers comprise SCSI World-Wide ID (WWID) values.

11. The fibre channel proxy of claim 7, wherein the unique device identifiers for the one or more initiators are presented by the fibre channel proxy to the one or more storage targets or to a storage fabric.

12. The fibre channel proxy of claim 7, wherein the unique device identifiers for the one or more storage targets are presented by the fibre channel proxy to the one or more initiators or to a storage fabric.

13. The fibre channel proxy of claim 7, wherein the unique device identifiers are originally used by a storage fabric connected to the one or more storage targets and are re-used by the fibre channel proxy to communicate with the one or more storage targets.

14. The fibre channel proxy of claim 7, wherein the unique device identifiers are originally used by a storage fabric connected to the one or more initiators and are re-used by the fibre channel proxy to communicate to the one or more initiators.

15. The fibre channel proxy of claim 1, wherein the storage blocks in the one or more storage targets each have a unique address mapping in the fibre channel proxy.

16. A method, comprising:
  operating a networked agent as an intermediary for a storage operation conducted between an initiator and a target;
  identifying, by the networked agent, a port identifier for the initiator;
  identifying, by the networked agent, a port identifier for the target;
  receiving, by the networked agent, the storage operation from the initiator;
  forwarding, by the networked agent, the storage operation to the target;
  using by the networked agent, the port identifier for the initiator to communicate with the target during the storage operation; and
  using, by the networked agent, the port identifier for the target to communicate with the initiator during the storage operation.

17. The method of claim 16, wherein:
  the storage operation comprises a fibre channel command; and
  the networked agent is transparently deployed to receive the fibre channel command from the initiator and forward the fibre channel command to the target without the initiator or target changing fibre channel access configurations or changing fibre channel control configurations.

18. The method of claim 16, wherein the initiator and the target are connected to the networked agent through a storage fabric.

19. The method of claim 16, wherein the initiator comprises a router or switch and the networked agent is configured to forward the storage operation received from the router or switch to the target.

20. The method of claim 16, wherein the networked agent is configured to receive the storage operation and forward the storage operation using a network based storage protocol.

21. The method of claim 16, further comprising:
  communicating, by the networked agent, with the initiator through a fibre channel port in the initiator;
  communicating, by the networked agent, with the target through a fibre channel port in the target; and
  using, by the networked agent, the port identifier for the initiator and the port identifier for the target during the storage operation transparently without reconfiguring the fibre channel port in the initiator or reconfiguring the fibre channel port in the target.

22. A method, comprising:
  receiving read operations from an initiator directed to storage blocks in a storage target;
  mapping physical storage addresses in the read operations to virtual storage addresses;
  searching a local storage media within a fibre channel proxy for local data associated with the virtual storage addresses;

reading the local data associated with the virtual storage addresses from the local storage media and sending the local data to the initiator;

forwarding the read operations to the storage target when the local storage media does not contain the local data associated with the virtual storage addresses;

forwarding storage data returned from the storage target to the initiators and also copying the storage data into virtual storage addresses in the local storage media; and mapping the physical storage addresses from the read operations to the virtual storage addresses where the storage data is copied in the local storage media.

23. The method of claim 22, further comprising removing local storage blocks within the local storage media after a predetermined time period.

24. The method of claim 23, wherein the predetermined time period is a constant time interval.

25. The method of claim 24, wherein the constant time interval is extended for particular local storage blocks after the read operations to those particular local storage blocks.

26. The method of claim 22, further comprising removing particular local storage blocks within the local storage media immediately following the read operations to those particular local storage blocks.

27. The method of claim 24, wherein the constant time interval is dynamically varied according to storage block access patterns of the initiator.

28. The method of claim 22, wherein the fibre channel proxy retrieves storage blocks from the storage target in response to the read operations from the initiator when the storage blocks are not present within the local storage media.

29. The method of claim 22, wherein the virtual storage addresses contain a reference to the local storage media.

30. The method of claim 29, wherein the virtual storage addresses are address offsets into a local Dynamic Random Access Memory (DRAM) in the fibre channel proxy.

31. The method of claim 29, wherein the virtual storage addresses comprise a device identifier and an address offset to a solid state media.

32. The method of claim 29, wherein the virtual storage addresses use an indirection table that associates the virtual storage addresses with a local media type.

* * * * *

UNITED STATES PATENT AND TRADEMARK OFFICE
CERTIFICATE OF CORRECTION

PATENT NO. : 8,160,070 B2
APPLICATION NO. : 12/568612
DATED : April 17, 2012
INVENTOR(S) : Dai et al.

It is certified that error appears in the above-identified patent and that said Letters Patent is hereby corrected as shown below:

Column 12, line 65, in Claim 1, after "set of" delete "one of".

Column 14, line 26, in Claim 16, after "using" insert -- , --.

Signed and Sealed this
Twenty-seventh Day of November, 2012

David J. Kappos
*Director of the United States Patent and Trademark Office*